Patented Mar. 16, 1926.

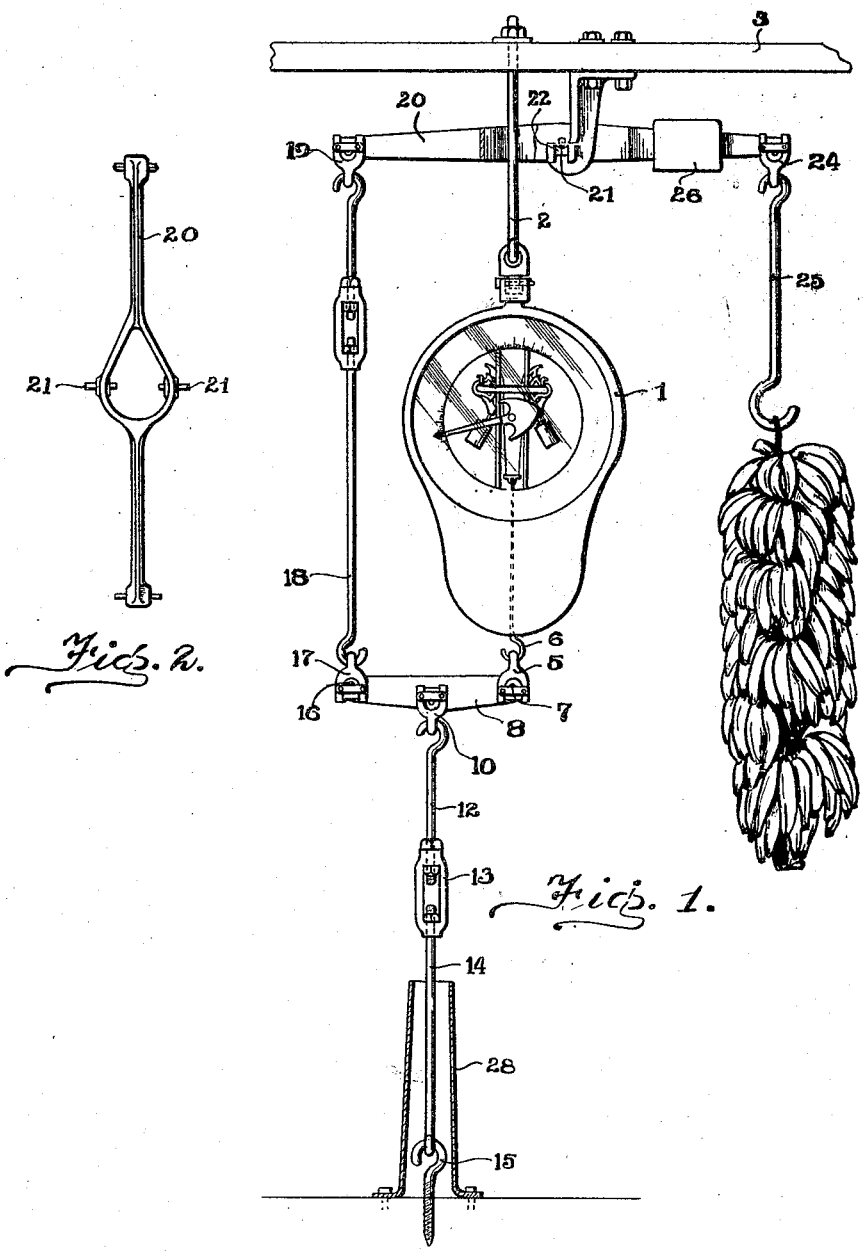

1,577,018

UNITED STATES PATENT OFFICE.

CLARENCE H. HAPGOOD, OF TOLEDO, OHIO, ASSIGNOR TO TOLEDO SCALE COMPANY, OF TOLEDO, OHIO, A CORPORATION OF NEW JERSEY.

WEIGHING MECHANISM.

Application filed December 10, 1919. Serial No. 343,854.

*To all whom it may concern:*

Be it known that I, CLARENCE H. HAPGOOD, a citizen of the United States, residing at Toledo, in the county of Lucas and State of Ohio, have invented certain new and useful Improvements in Weighing Mechanism, of which the following is a specification.

This invention relates to weighing mechanism, and particularly to mechanism for weighing bulky commodities which, by reason of their shapes or liability to injury, it is desirable to weigh while suspended rather than while lying upon a platform or similar support.

One of the objects of the invention is the provision of a weighing system whereby the weight of suspended articles of great bulk or length, such as bunches of bananas, is shown on a dial or index conveniently located adjacent the suspension member and at the right height for correct reading.

Another object is the provision, in combination with the load-offsetting mechanism, of a system of levers which makes possible the installation of scales for weighing suspended commodities of considerable bulk or length in rooms where the distance between the floor and ceiling is not great enough to permit such commodities to be hung beneath the scale proper.

With the above and other objects in view which will readily appear as the invention is better understood, my invention consists in the novel construction, combination and arrangement of parts to be hereinafter more fully described and particularly pointed out in the appended claims.

Reference is to be had to the accompanying drawings illustrating a preferred embodiment of my invention and wherein similar reference numerals designate similar parts throughout the several views.

In the drawings:

Figure 1 is an elevation of my improved weighing mechanism, showing a preferred arrangement of my levers in position for use; and Figure 2 is a plan view of the overhead lever carrying the commodity-receiver.

Referring to the drawings, the load-offsetting mechanism, as well as the indicating mechanism, are shown as embodied in a scale frame 1 suspended by means of a hook bolt 2 from the ceiling or other overhead support 3. In the system shown I have illustrated an automatic hanging scale of the pendulum type, with which the lever system has proven to be well adapted, but it is to be understood that any type of scale may be used in connection with the lever system without departing from the spirit of the invention in its broad aspect.

An inverted stirrup 5 is carried by the hook 6 depending from the load-offsetting mechanism of the scale, and mounted in bearings in the stirrup 5 are knife-edge pivots 7 rigidly secured to one end of a lower lever 8 which is fulcrumed intermediate its ends on upturned pivots bearing in a stirrup 10. The stirrup 10 is tied to the floor by means of an adjustable link, shown as comprising a hook bolt 12 engaging the stirrup, a turn buckle 13, and an eye-bolt 14, the latter being connected to the floor by means of a screw hook 15. The end of the lever 8 opposite the stirrup 5 is provided with pivots 16 which engage bearings in an inverted stirrup 17 connected by an adjustable link 18 to the upper lever 20.

As shown in the drawings, the arms of the lower lever 8 are equal. The knives of the end pivots 7 and 16 are directed downwardly and the knife edges of the pivots 9 are directed upwardly. An upward pull on the stirrup 17 therefore results in an equal downward pull by the stirrup 5. If, however, circumstances render it expedient, the arms of the lever 8 may be unequal so that the force transmitted thereby is increased or decreased.

The link 18 engages a stirrup 19 resting on pivots in one end of the upper lever 20, the fulcrum pivots 21 of which are arranged intermediate its ends and rock in bearings 22 mounted in a forked bracket 23 secured to the overhead support 3. The opposite end of the lever 20 carries pivots engaging a stirrup 24 from which depends a commodity-receiver, here shown as a hook 25. It will be noted that by this arrangement the commodity-receiver may be placed at a point which is higher than the lower end of the scale. A weight 26 is adjustably mounted on the commodity-receiving end of the lever 20 and serves with the hook 25 to so counterbalance the weight of the links and levers connected to the other side of the fulcrum pivot 21 that the lever 20 will remain in horizontal position and there will be no, or a very slight, initial pull on the load-offsetting mechanism. In order to provide for lateral stability, the lever 20 is expanded at its central portion and the fulcrum pivots 21 are thereby spaced apart laterally. When it is desired to extend the lever 20 in a plane parallel to the face of the scale, the hook bolt 2 may pass downwardly through the opening which is shown in the expanded central portion of the lever.

By the use of my arrangement of levers in connection with the scale it is prevented from swinging when a load is placed upon the commodity-receiver, and a quicker reading of the dial is therefore possible than in using a hanging scale alone. This prevention of swinging also results in less vibration and less wear upon the delicate weighing mechanism of the scale.

It will be understood that the overhead lever may have unequal arms so that the force exerted by a downward pull on the hook 25 is increased or diminished as it is transmitted to the link 18. Means may be provided to protect the adjustable link 11 from injury, as through contact with passing trucks, etc. In the illustrated embodiment I have provided an upright tubular housing 28 which is firmly secured to the floor and surrounds the eye-bolt 14 constituting the lower part of said link.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In weighing mechanism, in combination, a ceiling bracket, a lever fulcrumed thereon, a commodity-receiver connected to one end of said lever, a floor connection, a lever fulcrumed thereto, a connection between said levers, a weighing scale, and a connection between the second said lever and said scale.

2. In weighing mechanism, in combination, a ceiling bracket, a lever fulcrumed thereon, a commodity-receiver connected to one end of said lever, a floor connection, a lever fulcrumed thereto, a connection between last said lever and the end of the first said lever opposite the commodity-receiver, a hanging weighing scale, and a connection between the second said lever and said scale.

3. In weighing mechanism, an overhead lever adapted to be connected to a commodity-receiver and to an automatic hanging scale, said lever having an opening therein for the passage of the scale hanger.

4. In weighing mechanism, an overhead lever adapted to be connected to a commodity-receiver and to an automatic hanging scale, said lever having an opening therein for the passage of the scale hanger, and fulcrum pivots located at each side of said opening.

5. In weighing mechanism, in combination, a ceiling bracket, a lever fulcrumed thereon, a commodity-receiver connected to one end of said lever, a floor connection, a guard therefor, a lever fulcrumed to said floor connection, a connection between the last said lever and the end of the first said lever opposite the commodity-receiver, a weighing scale, and a connection between the second said lever and said scale.

CLARENCE H. HAPGOOD.